Patented June 19, 1945

2,378,833

UNITED STATES PATENT OFFICE 2,378,833

CROSS LINKED PRIMARY AROMATIC AMINE FORMALDEHYDE RESINS AND METHODS OF MAKING THE SAME

Loring Coes, Jr., Brookfield, Mass., assignor to Norton Company, Worcester, Mass., a corporation of Massachusetts No Drawing. Application July 23, 1942, Serial No. 452,093

7 Claims. (Cl. 260—72)

This invention relates to resins and more particularly to the polymerized condensation product of a primary aromatic amine with formaldehyde.

One object of the invention is to provide a resinous product comprising a primary aromatic amine formaldehyde resin and particualrly an aniline formaldehyde resin which has been hardened or converted to an infusible condition.

Another object of the invention is to harden such resins with a hardening agent which during the heat conversion stage will not react to form water and cause distortion of a body molded therefrom.

Another object of the invention is to provide a method of making a final resin product, or an intermediate product capable of producing the same, whereby a primary aromatic amine formaldehyde resin may be materially hardened.

Another object is to provide a method of this type wherein a resin or a mixture of the resin with granular material or a suitable filler may be cold-molded and the molded object thereafter heat cured while not confined under pressure.

Another object is to provide a method of making molded objects, with or without granular material, with the aid of an agent which serves as a wettant and a plasticizer for a primary aromatic amine formaldehyde resin prior to heat hardening and which ultimately acts as a hardening and cross linking agent for the resin without producing water during the hardening stage or causing distortion of the formed body. Other objects will be in part obvious or in part pointed out hereinafter.

The invention accordingly consists in the compositions and products and in the several steps and relation and order of each of said steps to one or more of the others thereof, all as will be illustratively described herein, and the scope of the application of which will be indicated in the following claims.

I provide a quantity of a primary aromatic amine, such as aniline, ortho, meta or para toluidine, or diamino diphenyl methane; and a quantity of formaldehyde. I may optionally provide a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —$CH_2$— groups to form a tough, heat resistant, semi-thermoplastic resin. I may add some of the formaldehyde after the initial condensation, in the form of paraformaldehyde, or by the addition of hexa-emthylene-tetramine.

As examples of the halogenated organic compound, I may use any of polyvinyl chloride, polyvinylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1, 2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin; ethylene bromhydrin, or glycerol alpha gamma dichlorhydrin. Naturally enough, most of the examples are chlorinated compounds because these are cheaper and more readily available than the brominated or iodated compounds, but the latter two give effective results. The fluorinated compounds are rejected because they are too stable and will not alkylate the polymer. However, so far as the broad features of this invention are concerned, and apart from the esters hereinafter described, the above-mentioned halogenated organic compound may be omitted altogether.

Since one aspect of the invention relates to grinding wheels and other solid abrasive compositions and articles, I may also provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware). The furfural cross links the polymer and, therefore, converts it to the "infusible" condition. A stoichiometric quantity of aniline and formaldehyde condensed in the presence of a strong acid is believed to produce a resin which is structurally represented thus:

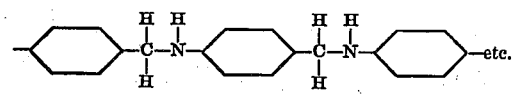

Such a resin cross-linked with furfural is believed to be represented thus:

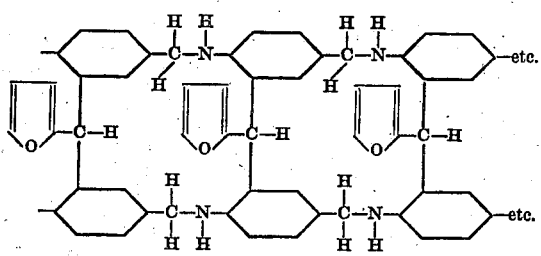

In accordance with my invention, I propose to harden a primary aromatic amine formaldehyde resin by means of certain esters of ethylene chlorhydrins with polybasic acids which are capable, under suitable heat treatment, of alkylating and cross linking the resin. These esters may be used either with or without the above-mentioned halogenated organic compounds and with or without abrasive grains or suitable fillers. I may also use suitable wettant plasticizers, such as furfural, but I prefer to use these alkylating and cross linking esters alone for this purpose, since the selected hardening reagents are capable of initially wetting and plasticizing a green mixture of the resin and any suitable granular or filler material and thereby aid in the molding operation before the reagent has been caused to react with the resin to alkylate and cross link the same.

Thus, I may use di-2chlorethyl phthalate; this ester is:

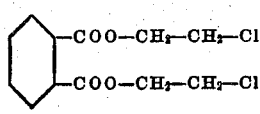

Or I may use di-2chlorethyl maleate; this ester is:

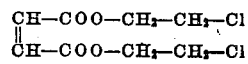

Or I may use di-2chlorethyl succinate; this ester is:

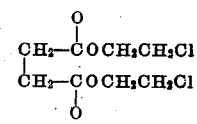

I believe the cross-linking thereby of the aniline-formaldehyde polymer is as shown by the following:

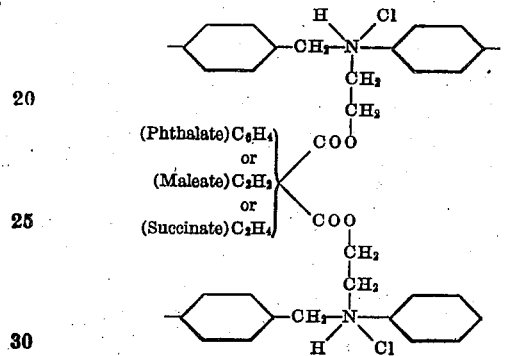

It will be noted that chlorine now appears in the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

In the making up of abrasive wheels or other articles, according to my invention, I am enabled to achieve also other advantages; for example, the "green" wheel or other shape of body does not have to be pressed and heat-cured at the same time and on the contrary, after shaping it in any suitable way, it can be heat-treated for a suitable length of time, as in an oven, thus making it possible to avoid tying up expensive hot-press equipment. Moreover, abrasive wheels made according to my invention may be given, in general, the general characteristics of rubber-bonded wheels and thus may serve for grinding purposes where such characteristics are required or desired.

However, my invention also consists in the discovery that such esters as the above-mentioned ones function as good solvents and plasticizers as well as alkylating and cross linking hardening agents for aromatic amine formaldehyde resins, with or without fillers, and thus articles other than abrasive bodies may be made, the final resin product being tough and of suitable hardness and lending itself, in its intermediate stage, that is, prior to heat treatment or prior to final curing, readily to molding or shaping into forms or configurations as desired. When used, however, in the making of abrasive bodies, I achieve a number of unique advantages and coactions, some of which are mentioned above and others of which are mentioned later hereinafter; thus, for example, these esters make available, in the final cross-linking with the above-mentioned polymer, of hydrogen chloride and moreover in a manner to bring about its liberation at the grinding-line under the heat effect there present, as mentioned above.

A preferred or illustrative method of making these esters may be as follows:

Thus, as to di-2chlorethyl phthalate, I may start with a mixture of 148 grams of phthalic anhydride (1 mol) and 320 grams of ethylene chlorhydrine (4 mols) and heat it with 10 grams of p.toluene sulphonic acid; the latter I believe acts as a catalyst. The mixture is heated at such a rate, as in a flask provided with a short distillation column, that liquid is distilled at the rate of about 1 drop per 5 seconds. Heating is continued until the temperature in the boiling liquid rises to about 175° C. (about 8 hours). The mixture is then cooled, and is then neutralized with sodium carbonate, and washed with water, then dried, for example, over sodium sulphate. The ester so produced may be further purified as by distillation at reduced pressure, but I find it is sufficient merely to heat the product at 100° C. under a pressure of 20 millimeters until all traces of volatile impurities are removed, illustratively for a period of about 4 hours. The product is a slightly colored, heavy liquid and has a mild odor. It is a good solvent for aniline formaldehyde resins.

Di-2chlorethyl maleate and di-2chlorethyl succinate may be prepared in the same way and they too are good alkylating and cross linking agents as well as plasticizing solvents for aniline formaldehyde.

In using them with aldehyde resins, with or without fillers or with or without abrasive grains, the following several examples as to the making of abrasive wheels will be illustrative:

*Example I*

525 grams of #46 grit "Alundum" abrasive grains are wet with 20 cc. of di-2chlorethyl phthalate, and here I find that the ester is a ready and good wettant for the grains; thereto I add 165 grams of a mixture, by volume, of 65% of an aniline formaldehyde resin, 30% of cryolite, and 5% of soluble anhydrite, and effect a good admixture or stirring thereof, thereby arriving at a so-called "dry granular mix." The mix is now spread in a 6" mold (where a grinding wheel is to be made), and pressed to a pore volume of 15 per cent; this can be done cold or at room temperature. The "green" wheel is then stripped from the mold, and placed in an oven for heat treatment and curing. The initial curing temperature is about 95° C. and the temperature is raised gradually to about 175° C. over a period of 4 hours, and then kept at about that temperature for 2 hours, and then slowly cooled.

As to the other esters, the same procedure can be followed, using the same proportions of materials.

*Example II*

525 grams of #80 grit "Alundum" abrasive grains are wet with 25 cc. of di-2chlorethyl phthalate and thereto is added, with thorough stirring or mixing, 165 grams of a mixture, by volume, of 65% of an aniline formaldehyde resin, 30% of cryolite, and 5% of soluble anhydrite, resulting in a "dry granular mix." The latter is then worked on differential mixing rolls until a sheet is formed which is passed through calender rolls to achieve the desired thickness, in this instance 1/16". Out of that sheet a 12" disk is cut and the disk is then placed in an oven and cured as described in the foregoing Example I.

As for the other esters, a similar procedure may be employed, using the same proportions of materials.

A wheel made according to Example II was tested on 3/4" cold rolled steel and it showed an areal wheel wear of 0.062 square inch per cut, running wet, and of 0.093 square inch per cut, running dry, indicating a range of durability like that of rubber-bonded wheels.

A wheel made according to Example I was tested as a portable snagging wheel with good results; its resiliency was of such an order as to greatly facilitate manual control of the positioning or movement of the wheel and the pressure of its application and gave the wheel a free cutting and smooth action.

According to certain prior practices, difficulties are encountered during heat treatment or curing, due to the fact that swelling occurs; such swelling usually results from the formation of water and is aggravated by the conversion of water or possibly also of other constituents into vapors, under the action of the heat treatment. But according to my invention such disadvantages and defects are successfully overcome and I find that, in practicing my invention, no such swelling occurs; this is due to the fact that no water or other liquid or vapors thereof, as would cause swelling, during the heat treatment or curing, are formed.

I make no claim herein to abrasive wheels or other abrasive articles or to the method of making the same, since that subject matter is claimed in my copending Patent No. 2,319,793 of May 25, 1943.

It will thus be seen that there has been provided by this invention, an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. An intermediate product that is moldable and capable of being set or hardened under heat treatment comprising an aromatic amine formaldehyde resin and a hardening agent that comprises a compound selected from the group comprising di-2chlorethyl phthalate, di-2chlorethyl maleate and di-2chlorethyl succinate.

2. A resin comprising a primary aromatic amine formaldehyde resin alkylated and cross linked by an agent taken from the group consisting of di-2chlorethyl phthalate, di-2chlorethyl maleate and di-2chlorethyl succinate.

3. A resinous product comprising aniline formaldehyde resin alkylated and cross linked by a hardening agent comprising a compound selected from the group consisting of di-2chlorethyl phthalate, di-2chlorethyl maleate and di-2chlorethyl succinate.

4. The method of making a moldable, heat settable intermediate product which comprises the steps of adding to and mixing with a primary aromatic amine formaldehyde resin an alkylating and cross linking agent comprising a compound selected from the group consisting of di- 2chlorethyl phthalate, di-2chlorethyl maleate and di-2chlorethyl succinate.

5. The method of making a resinous product comprising the steps of mixing a primary aromatic amine formaldehyde resin with a hardening agent comprising essentially an alkylating and cross linking agent selected from the group consisting of di-2chlorethyl phthalate, di-2chlorethyl maleate and di-2chlorethyl succinate, shaping the mixture to a desired configuration and thereafter heating the mass to cause said agent to react with and harden the resin.

6. The method of making a resinous product which comprises the steps of mixing aniline formaldehyde resin with a hardening agent comprising essentially an alkylating and cross linking agent selected from the group consisting of di-2chlorethyl phthalate, di-2chlorethyl maleate and di-2chlorethyl succinate, shaping the mixture to a desired configuration and thereafter heating the mass to cause said agent to react with and harden the resin.

7. The method of making a resinous product which comprises the steps of cold-molding a plastic mixture containing an aniline formaldehyde resin and a hardening agent comprising essentially an alkylating and cross linking agent selected from the group consisting of di-2chlorethyl phthalate, di-2chlorethyl maleate and di-2chlorethyl succinate, and thereafter heating the molded mass to cause said agent to react with and cross link the resin.

LORING COES, JR.